United States Patent [19]

Fredrickson

[11] Patent Number: 4,984,371
[45] Date of Patent: Jan. 15, 1991

[54] CHAIN SAW LOG GAUGE FOR OBTAINING FIREWOOD LOGS OF UNIFORM LENGTH

[76] Inventor: Robert N. Fredrickson, 606 Lake Ave., Ironwood, Mich. 49938

[21] Appl. No.: 384,434

[22] Filed: Jul. 25, 1989

[51] Int. Cl.⁵ .............................................. G01C 3/02
[52] U.S. Cl. ...................................... 33/263; 33/630; 33/286
[58] Field of Search .............. 33/630, 286, 202, 263, 33/275 R; 83/802; 16/DIG. 13

[56] References Cited

U.S. PATENT DOCUMENTS

| | | | |
|---|---|---|---|
| 494,988 | 4/1893 | Libbey | 16/DIG. 13 |
| 1,568,759 | 1/1926 | Magin et al. | 356/8 |
| 2,898,109 | 8/1959 | Williams | 33/263 |
| 3,364,580 | 1/1968 | Lucia | 33/630 |
| 4,060,908 | 12/1977 | Skallerup | 33/277 |
| 4,158,259 | 6/1979 | Hansen et al. | 33/262 |
| 4,233,739 | 11/1980 | Hinrichs | 33/630 |
| 4,319,404 | 3/1982 | Brock | 33/263 |
| 4,388,762 | 6/1983 | Debell, Jr. et al. | 33/630 |

OTHER PUBLICATIONS

Three pages from Tilton Equipment Company catalog showing their product TL341 on p. 72.

Primary Examiner—Thomas B. Will
Attorney, Agent, or Firm—Glenn W. Bowen

[57] ABSTRACT

A log gauge for a chain saw is provided which enables an operator to repeatedly cut approximately equal lengths of firewood logs with only a minimal amount of effort being required to visually measure the logs. This accomplished by a mirror that is affixed to one leg of a frame member while the other leg is secured to the handle of the chain saw. The mirror is adjusted by an adjusting bolt so the operator can align on a visual indicator relative to the image of the end of the log in the mirror with respect to a scribed line on the mirror. One embodiment of the frame is formed by utilizing a unitary flexible plastic frame with a C-shaped bridge having a reduced cross sectional area that allows one leg to flex relative to the other thereby allowing the operator to adjust the mirror for different lengths of logs. A second embodiment of the invention substitutes a hinge for the C-shaped bridge which reduces the dimensions of the log gauge and does not require that the frame be made of an inherently flexible material.

19 Claims, 2 Drawing Sheets

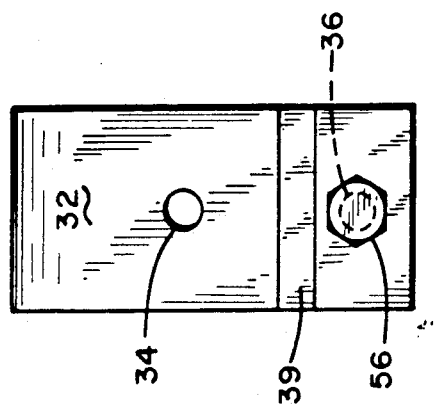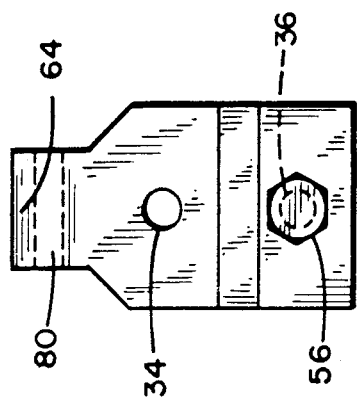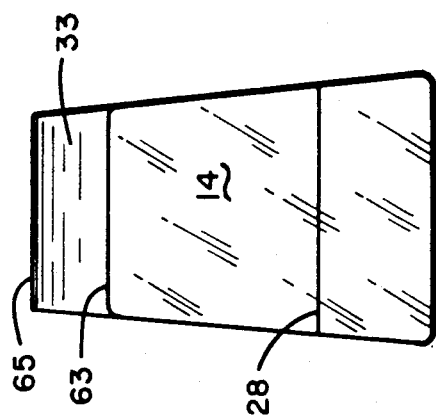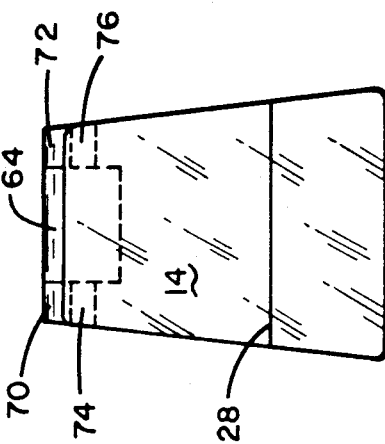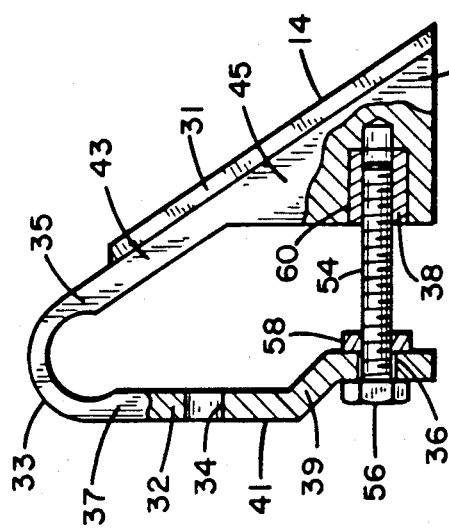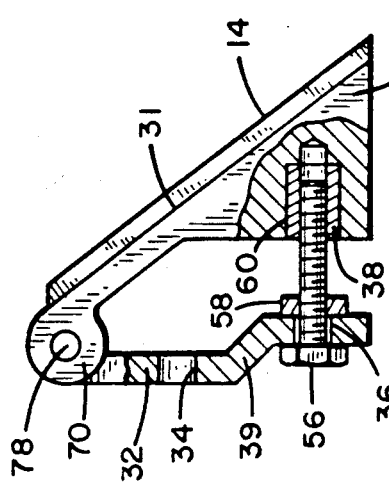

CHAIN SAW LOG GAUGE FOR OBTAINING FIREWOOD LOGS OF UNIFORM LENGTH

BACKGROUND OF THE INVENTION

The present invention is related to chain saw log gauges which are used to provide a firewood stack of substantially uniform length logs. In particular, this invention is directed to a visual alignment log gauge which is compact and lightweight, does not appreciably affect the balance point of the chain saw, is easily adjustable for different length logs and is relatively inexpensive. The gauge allows an operator to saw a stack of firewood of uniform length with only a minimal amount of additional effort being required to utilize the log gauge.

The length of firewood for any given fireplace is, of course, restricted to a certain maximum length. In addition, many homeowners and owners and managers of commercial establishments with fireplaces desire that their wood stacks be formed of substantially uniform logs for esthetic reasons. For firewood suppliers the ability to provide uniform length cords of wood can be a factor in the saleability of their wood.

A log gauge for measuring uniform length logs has been marketed under the product number TL341 by Tilton Equipment Company, which issued a publication that indicated they had an office at 4575 North Chatsworth Street, St. Paul, Minn. 55125.

The gauge consisted of a stainless steel rod that was supported at an angle substantially normal to the elongated, flat side of the chain saw guideplate by snap-action mount on the handle. A red color measuring tip was slideable along the rod until it engaged the face of the log at the desired length.

SUMMARY OF THE INVENTION

A chain saw log gauge is provided, which enables an operator to cut uniform length firewood logs, that incorporates a light reflector that has a scribed line that runs across it so that the operator aligns the image of the log to be cut with the scribed line to obtain cut logs of a constant length. The log gauge is attached to the handle of the chain saw by a stainless steel or plastic clamp, which may be aligned to achieve the desired initial adjustment of the mirror and the sight line. The log gauge has two legs that are joined at an end which allows the two legs of the log gauge to be flexed more or less closer to each other by adjustment of an adjusting bolt that extends between the two legs to adjust for different length logs without remounting the gauge.

BRIEF DESCRIPTION OF THE DRAWINGS

The present invention is described by reference to the drawings in which:

FIG. 3 is a side partial cross-sectional view of the log gauge of FIG. 2;

FIG. 4 is the mirror surface front view of the log gauge of FIG. 2;

FIG. 5 is a rear view of the log gauge of FIG. 2;

FIG. 6 is a side partial cross-sectional view of a second embodiment of the log gauge of the present invention which is hinged to make it more compact;

FIG. 7 is a mirror surface front view of the log gauge of FIG. 6; and

FIG. 8 is a rear view of the log gauge of FIG. 6.

DESCRIPTION OF THE INVENTION

The purpose of the chain saw log gauge of the present invention is to aid the operator of a chain saw to cut similar lengths of firewood. The gauge is designed to enable the operator of a chain saw to cut uniform lengths of firewood once it is firmly attached to the chain saw and adjusted to enable the operator to visually gauge, or measure, the desired length of the firewood logs being cut.

An object of the invention is to utilize light reflection to enable the operator to rapidly gauge the proper length of logs to be cut. This is accomplished with a mirror that is mounted on a mounting frame which is attached to a chain saw. Light is reflected from the end of the log into the eye of the chain saw's operator. The angle and position of the mirror that is attached to the chain saw is adjustable, which allows the operator to quickly adjust the gauge for different lengths of firewood.

Figure 1:
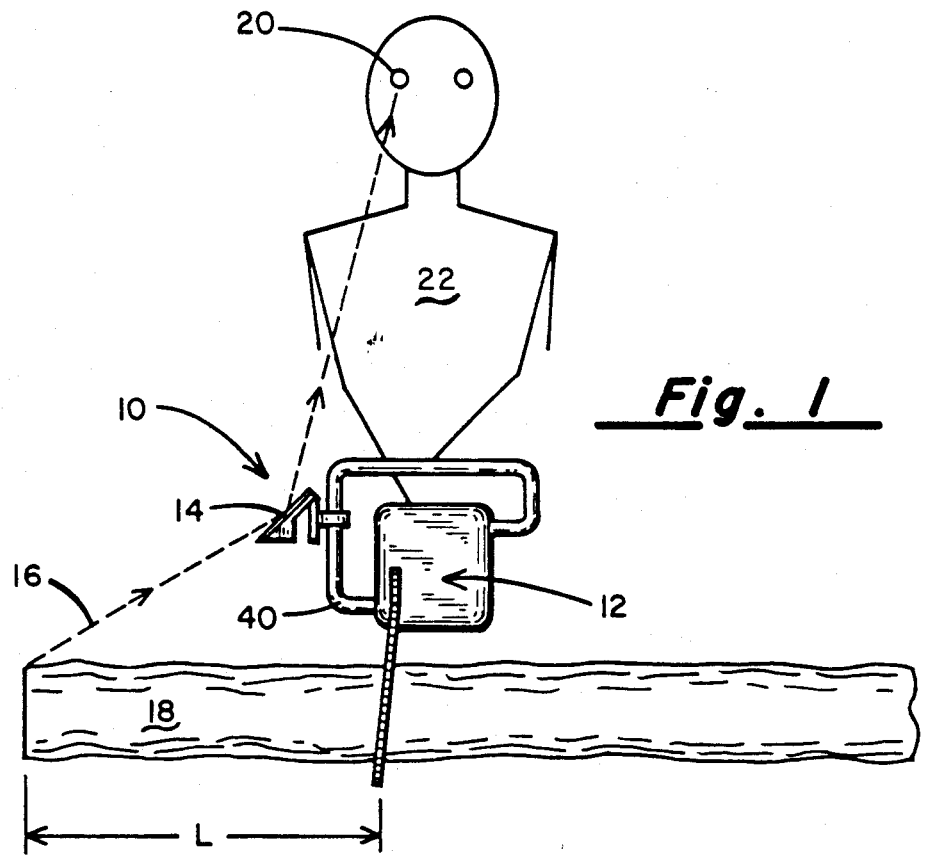
FIG. 1 is a schematic drawing that illustrates the manner in which the log gauge of the invention is utilized by a chain saw operator to obtain uniform length logs.

FIG. 1 illustrates the general principles of operation of a log gauge 10, constructed in accordance with the present invention, which enables an operator to gauge the length of logs that are cut by a chain saw 12. The log gauge is preferably mounted on the cutting side, of the chain saw, and above the cutting chain. A mirror 14 reflects light (illustrated by the dotted line 16) from the end of the log 18 to the eye 20 of the operator 22.

Figure 2:
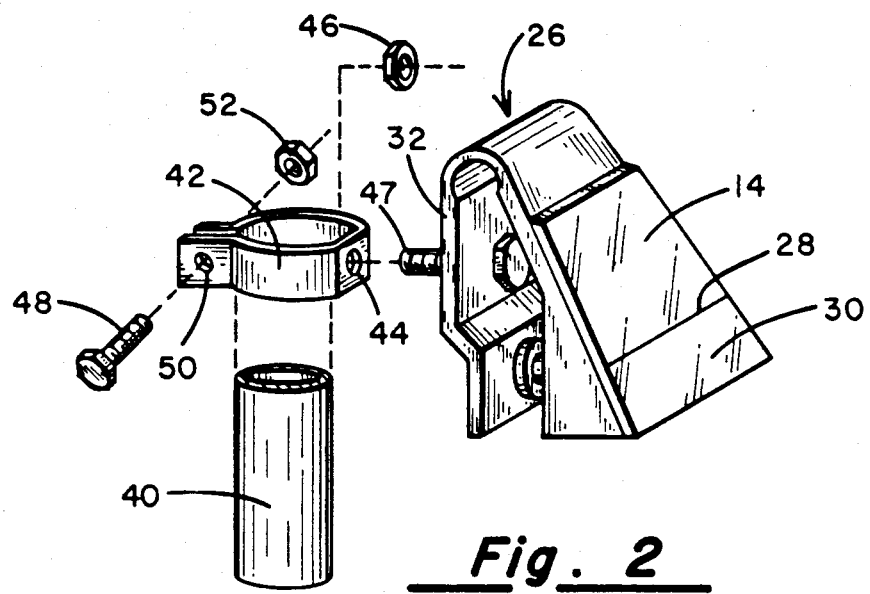
FIG. 2 is a perspective exploded view of one embodiment of the log gauge of FIG. 1 which also shows a portion of the handle of the saw and the mounting device.

FIG. 2 is a perspective view of one embodiment of the present invention in which the mirror 14 is secured to a frame 26. The mirror desirably has a scribed line 28 on it which serves as a point of reference for the measurement. The scribed line is desirable but not necessary as some other form of indicia, or even the end of the mirror itself may be used as a position marker to locate the end of the log, assuming the opposite end is placed at a marked location. When the scribed line is used, the log is positioned so that image of the log is aligned with the base of the log resting on the line. The scribed line on the mirror when viewed from above by the chain saw operator appears as 2 lines to the operator, and the visual space between the lines serves as a sight which is aligned parallel to, and under the image of the log in the mirror. The length of the object being measured is determined by the angle of the mirror, the height of the mirror above the log and the height of the operator's eyes above the mirror.

The frame 26 is formed with two legs 30, 32 and is desirably made of a flexible plastic material. There are 2 through holes 34, 36 and one blind hole, or recess, 38 in leg 30 (shown in FIG. 3). The bolt 47 passes through hole 34 in the leg 32 and the hole 44 in the clamp 42 where it is secured by the nut 46. The bolt 48 that passes through holes 50 in the clamp receives the nut 52 to hold the clamp on the handle and thereby secure the mirror 14 to the handle 40. The hole 36 is used to receive the adjusting bolt 54 so that the head 56 of bolt 54 is on one side of the leg 32, and a lock nut 58 is on the other side. The blind hole 38 contains a threaded brass bushing 60 which is pressed into the blind hole 38. An adjusting bolt 54 screws into the brass bushing 60 in the leg 30.

The mirror 14 is preferably made of plastic material and may be as thin as one-eighth (⅛) of an inch thick. It is secured on the front face 31 of the leg 30 of the plastic frame. The scribed line 28 is desirably overlaid with a line of orange paint. The scribed line on the described embodiment is located above the base 62 of the mirror. The plastic mirror 14 may be fastened to the front of the plastic frame by a suitable adhesive. The angle of the mirror is controlled by the adjusting of the position of the bolt 54 relative to the brass bushing 60. A lock nut 58 is used with the bolt 54 to keep the mirror fixed at a constant angle. The initial mirror angle of the illustrated plastic frame is set to approximately 33 degrees in both of the pictured versions of the invention. However, the adjusting bolt allows this angle to be changed.

The frame 26 of the embodiment shown in FIGS. 3, 4 and 5 may be constructed with a unitary, flexible plastic frame 26 in which the legs 30, 32 are joined by the semicircular C-shaped bridge 33 which is of a smaller cross-section than the portions 35, 37 of the legs 30, 32, respectively, with which it is joined. The leg 32 extends vertically to an inwardly angled segment 39 which runs into a short vertical segment which contains the hole 36 through which the adjusting bolt 54 passes. The segment 39 is desirably included so the head 56 of the bolt 54 is recessed inwardly from the rear surface 41 of the leg 32.

The leg 30 is formed with the angled elongated segment 43 that supports the upper portion of the mirror 14 to a lower generally triangular block portion 45, which supports the remainder of the mirror and is thicker to receive the bushing 60 and the bolt 54.

The front view of FIG. 4 shows that the mirror 14 may have a generally trapezoidal shape where the top 63 of the mirror may be narrower than the base 62 to reduce the dimensions of the leg gauge. The hinge also allows the frame to be made of materials that are not inherently flexible or resistant. The leg 30 is similarly narrower at the top 65 of the C-shape than it is adjacent the top 63 of the mirror 14. The leg 32, on the other hand, may be rectangular in shape, as shown in FIG. 5.

The embodiment of FIGS. 6, 7 and 8 is similar to that of FIGS. 3, 4 and 5, except that a hinge is formed. The hinge is provided by an inner member 64 that is integrally formed with the leg 32, and an outer hinge loops 70, 72 that are integrally formed with the leg 30 and which receive the inner member between them. The loops 70, 72 have cylindrical bores 74, 76 which receive the hinge pin 78. FIG. 8 shows the rear leg 32 and the inner member 64 which has a bore 80 that receives the hinge pin 78.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

What is claimed is:

1. A chain saw log gauge means which is securable to a chain saw for enabling an operator to saw firewood logs to a substantially uniform desired length comprising:

first and second elongated leg means each of which have first and second ends, hinge means which is connected to said first and second leg means adjacent their first ends in such a manner that said second ends of said first and second leg means are movable relatively toward and away from each other, light reflector means secured to said first leg means intermediate said first and second ends of said first legs means, visual indicia means associated with said light reflector means, mounting means for securing said second leg means of said log gauge means in a fixed position on said chain saw, and adjusting means for moving said first leg means relative to said second leg means to adjust the position of said light reflector means so that length of said logs can be cut to said desired length by aligning said visual indicia means relative to the eyes of the operator and an image of an end of one of said logs in said light reflector means.

2. A chain saw log gauge means as claimed in claim 1 wherein said hinge means comprises a generally C-shaped bridge that is integrally formed with the first ends of said first and second legs and is made of a material that allows for resilient movement of said first leg means relative to said second leg means.

3. A chain saw log gauge means as claimed in claim 2 comprising threaded means with female threads which is secured to said first leg means, wherein said second leg means has a hole in it and said adjusting means is a fastener means that has a portion with male threads which pass through said hole and are in threaded engagement with said female threads of said threaded means and another portion of said fastener means has an enlarged feature that cannot pass through said hole.

4. A chain saw log gauge means as claimed in claim 3 wherein said first leg means comprises an enlarged integral block means that comprises a surface that faces said second leg means and has a blind hole formed therein, and said threaded means is located in said blind hole.

5. A chain saw log gauge means as claimed in claim 4 wherein said light reflector means comprises a plane surface mirror means.

6. A chain saw log gauge means as claimed in claim 5 wherein said visual indicia means comprises a line that runs across said plane surface mirror means in a manner such that said line is substantially parallel to the image of the end of said one of said logs in said plane surface mirror means when the chain saw is aligned to cut said log.

7. A chain saw log gauge means as claimed in claim 1 wherein said hinge means is formed by first and second hinge members which are integrally formed with said first and second leg means, respectively, and each of which have a retaining passageway through them, and hinge pin means for insertion into said passageway for holding said first and second hinge members in place relative to each other in a manner that allows for relative movement of said first and second hinge members.

8. A chain saw log gauge means as claimed in claim 7 comprising thread means with female threads which is secured to said first leg means, wherein said second leg means has a hole in it and said adjusting means is a fastener means that has a portion with male threads which pass through said hole and are in threaded engagement with said female threads of said threaded means and another portion of said fastener means has an enlarged feature that cannot pass through said hole.

9. A chain saw log gauge means as claimed in claim 8 wherein said first leg means comprises an enlarged integral block means that comprises a surface that faces said second leg means and has a blind hole formed therein, and said threaded means is located in said blind hole.

10. A chain saw log gauge means as claimed in claim 9 wherein said light reflector means comprises a plane surface mirror means.

11. A chain saw log gauge means as claimed in claim 10 wherein said visual indicia means comprises a line that runs across said plane surface mirror means in a manner such that said line is substantially parallel to the image of the end of said one of said logs in said plane surface mirror means when the chain saw is aligned to cut said log.

12. A gauge means which is securable to a portable tool for enabling an operator of the tool to align the tool relative to an object to be worked on by the tool comprising:
- first and second elongated leg means each of which have first and second ends,
- hinge means which is connected to said first and second leg means adjacent their first ends in such a manner that said second ends of said first and second leg means are movable relatively toward and away from each other,
- light reflector means secured to said first leg means intermediate said first and second ends of said first leg means,
- visual indicia means associated with said light reflector means,
- mounting means for securing said second leg means of said gauge means in a fixed position on said portable tool,
- and adjusting means for moving said first leg means relative to said second leg means to adjust the position of said light reflector means so that said tool may be positioned by the operator relative to said object to be worked on by aligning said visual indicia means relative to the eyes of the operator and an image of said object in said light reflector means.

13. A gauge means as claimed in claim 12 wherein said hinge means comprises a generally C-shaped bridge that is integrally formed with the first ends of said first and second legs and is made of a material that allow for resilient movement of said first leg means relative to said second leg means.

14. A gauge means as claimed in claim 13 comprising threaded means with female threads which is secured to said first leg means, wherein said second leg means has a hole in it and said adjusting means is a fastener means that has a portion with male threads which pass through said hole and are in threaded engagement with said female threads of said threaded means and another portion of said fastener means has an enlarged feature that cannot pass through said hole.

15. A gauge means as claimed in claim 14 wherein said first leg means comprises an enlarged integral block means that comprises a surface that faces said second leg means and has a blind hole formed therein, and said threaded means is located in said blind hole.

16. A gauge means as claimed in claim 15 wherein said light reflector means comprises a plane surface mirror means.

17. A gauge means as claimed in claim 12 wherein said hinge means is formed by first and second hinge members which are integrally formed with said first and second leg means, respectively, and each of which have a retaining passageway through them, and hinge pin means for insertion into said passageway for holding said first and second hinge members in place relative to each other in a manner that allows for relative movement of said first and second hinge members.

18. A gauge means as claimed in claim 17 comprising thread means with female threads which is secured to said first leg means, wherein said second leg means has a hole in it and said adjusting means is a fastener means that has a portion with male threads which pass through said hole and are in threaded engagement with said female threads of said threaded means and another portion of said fastener means has an enlarged feature that cannot pass through said hole.

19. A gauge means as claimed in claim 18 wherein said first leg means comprises an enlarged integral block means that comprises a surface that faces said second leg means and has a blind hole formed therein, and said threaded means is located in said blind hole.

* * * * *